United States Patent [19]

Shaw

[11] Patent Number: 4,653,660

[45] Date of Patent: Mar. 31, 1987

[54] INSERT FOR A FUEL TANK INLET AND A METHOD OF INSTALLING THE INSERT

[76] Inventor: James R. Shaw, P.O. Box 319, Amagansett, N.Y. 11930

[21] Appl. No.: 661,763

[22] Filed: Oct. 17, 1984

[51] Int. Cl.$^4$ ............................................. B65D 55/14
[52] U.S. Cl. .................................. 220/86 R; 220/302; 220/307
[58] Field of Search ............. 220/86 R, 86 AT, 85 F, 220/323, 327, 293, 297, 302, 326, 307

[56] References Cited

U.S. PATENT DOCUMENTS

| | | | |
|---|---|---|---|
| 2,467,088 | 4/1949 | Konchan | 220/302 |
| 3,966,080 | 6/1976 | Bittel | 220/307 X |
| 4,317,345 | 3/1982 | Hinson | 220/86 AT X |
| 4,334,561 | 6/1982 | Van Coillie | 220/86 R X |

Primary Examiner—Steven M. Pollard
Attorney, Agent, or Firm—Pennie & Edmonds

[57] ABSTRACT

An insert for a fuel tank inlet and a method of installing the insert. The insert reduces the size of the inlet so that, while nozzles that normally dispense avgas will fit into the inlet, larger nozzles that normally dispense jet fuel will not fit into the inlet. With one embodiment, the insert comprises a body having a central opening and apertures extending from the central opening to an outside annular surface. Screws extend within these apertures and are movable to an extended position to lock the insert in the fuel tank inlet. With another embodiment, the insert comprises a frame, an upper flange, and lower locking tabs. The insert is positioned in the inlet with the flange and the locking tabs engaging surfaces of a wall of the fuel tank that forms the inlet thereto, securely holding the insert in the inlet.

9 Claims, 14 Drawing Figures

INSERT FOR A FUEL TANK INLET AND A METHOD OF INSTALLING THE INSERT

BACKGROUND OF THE INVENTION

This invention generally relates to inserts for the fuel tank inlets of small aircraft, and more specifically to inserts that reduce the size of such inlets.

Small aircraft normally run on one of two types of fuel. Most older small planes use a fuel referred to as avgas, which is an abbreviated name for aviation gas, while most newer small aircraft use jet fuel. These two fuels are not interchangeable, and it is very important to provide a plane with the correct type of fuel.

Both of these fuels are usually dispensed from nozzles. The nozzles that are conventionally used to dispense jet fuel have diameters that are larger than the diameters of the nozzles that are conventionally used to dispense avgas. Many older small planes have fuel tank inlets that are large enough to receive both sizes of nozzles, however, and because of this, it is possible that older small planes may be mistakenly provided with jet fuel.

SUMMARY OF THE INVENTION

The present invention relates to an insert for a fuel tank inlet that reduces the size of that inlet so that nozzles of the type that are conventionally used to dispense jet fuel will not fit within the inlet. In accordance with a first embodiment, the insert comprises an annular body having a central axial opening large enough to receive nozzles of the type that are conventionally used to dispense avgas but small enough so that nozzles of the type that are conventionally used to dispense jet fuel will not fit within the opening. An upper flange extends upward and outward from the insert body to seat against a wall of a fuel tank that extends around an inlet thereto. The body of the insert has a plurality of apertures extending from the central opening of the insert body to an outside annular surface thereof. A plurality of securing means such as screws extend within these apertures and are supported by the insert body for movement between extended and retracted positions. In the retracted position, the securing means are retracted within the body apertures so that those securing means do not interfere with movement of the insert into the fuel tank inlet. In the extended position, the securing means project outside the insert body to lock the insert within the fuel tank inlet.

In accordance with a second embodiment of the present invention, the insert comprises a retainer member and a pawl member. The retainer member includes a cylindrical sidewall, an upper flange extending outward and slightly downward from the sidewall, and a lower flange that extends inward from that sidewall. The pawl member includes an annular ring and at least one lower locking tab that extends outward and upward from the annular ring. The annular ring of the pawl member is secured to the lower flange of the retainer member, with the locking tab of the pawl member extending outside the cylindrical sidewall of the retainer. In use, the upper flange of the retainer member and the lower locking tab of the pawl member engage upper and under surfaces, respectively, of a fuel tank wall that extends around an inlet to the fuel tank, holding the insert in tight pressure engagement with that wall.

By using the present invention, an owner or operator of an aircraft may render it virtually impossible to accidentally pump or pour jet fuel into the fuel tank of the aircraft. At the same time, the inserts of this invention are relatively simple and inexpensive to manufacture, assemble and install, and can be done so without elaborate instructions or any special skills, yet the inserts are very reliable, secure and durable. Moreover, the present invention is readily usable with a wide range of types of fuel tanks.

DETAILED DESCRIPTION OF THE PREFERRED EMBODIMENTS

Figure 1:
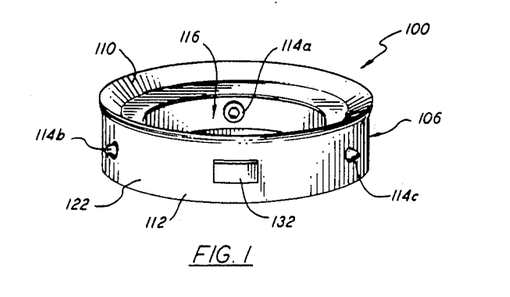
FIG. 1 is a perspective view of a fuel tank inlet insert in accordance with a first embodiment of this invention.
Figure 2:
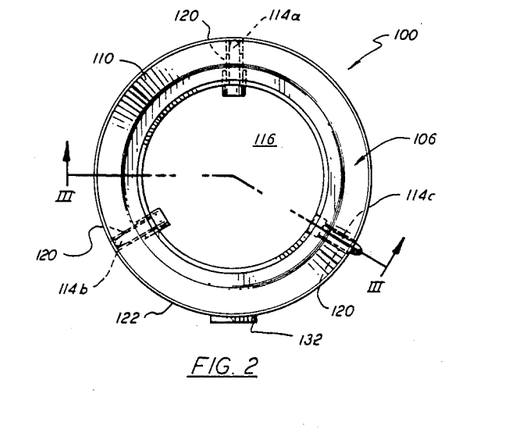
FIG. 2 is a top view of the insert shown in FIG. 1.
Figure 3:
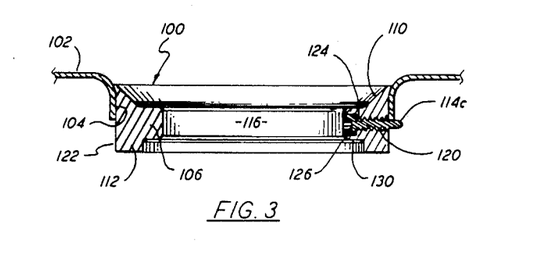
FIG. 3 shows a sectional view of the insert illustrated in FIGS. 1 and 2, taken along line III—III of FIG. 2.
Figure 4:
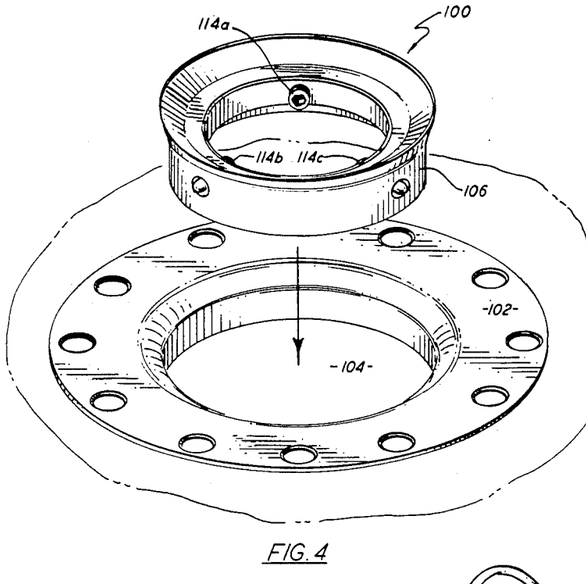
FIGS. 4 and 5 illustrate various steps of a method for installing the insert shown in FIGS. 1, 2 and 3 in a fuel tank inlet.
Figure 5:
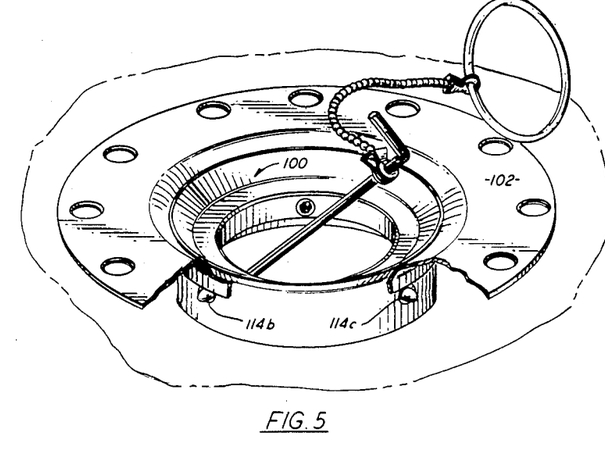
Figure 6:
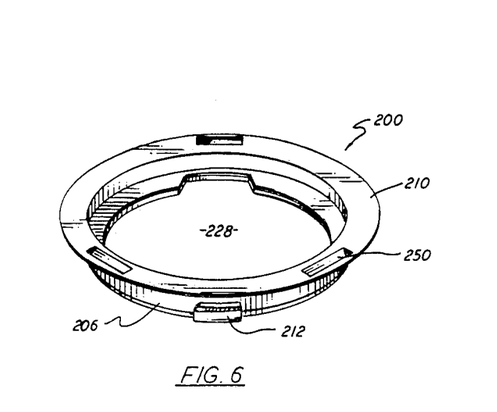
FIG. 6 is a perspective view of a fuel tank inlet insert in accordance with a second embodiment of this invention.

FIGS. 1 to 5 illustrate a first embodiment of an insert 100 of the present invention; and FIGS. 3, 4 and 5 also show a portion of a conventional adapter 102 that forms an inlet 104 to a fuel tank and with which insert 100 is used. FIGS. 6 through 12 illustrate a second embodiment 200 of this invention; and FIGS. 9, 10, 11 and 12 also show a portion of a conventional adapter 202 that forms an inlet 204 to a fuel tank and with which insert 200 is used. Typically, adapters 102 and 202 are separable from the main bodies of the fuel tanks with which the adapters are used, and each adapter is secured to the main body of a fuel tank, around an opening therein, to form inlet 104 or 204. For present purposes, each adapter 102 and 202 is considered to be part of the fuel tank with which the adapter is used. It should be noted that, of course, the present invention may be used with a fuel tank having an inlet that is formed by a flange or wall that is integral with the main body of the fuel tank.

With respect, first, to FIGS. 1 through 5, generally insert 100 comprises annular body 106, upper flange 110, lower flange 112, and securing means such as screws 114a, 114b and 114c. Body 106 forms a central axial opening 116 that is large enough to receive nozzles of the type that are conventionally used to dispense avgas but small enough so that nozzles of the type that are conventionally used to dispense jet fuel will not fit within that central opening. Lower flange 112 extends downward from body 106 and, as discussed in greater detail below, is provided to help secure a fuel tank cap to insert 100. Upper flange 110 extends upward and outward from body 106 and is provided to seat against a surface of adapter 102 that extends around inlet 104. Preferably the outside surface of the upper flange is shaped to fit complementarily against that surface of the adapter. In normal use, a fuel tank cap (not shown) covers opening 116 of insert 100, and the inside surface of upper flange portion 110 is shaped to fit complementarily against an abutting surface of that tank cap, providing a strong and uniform support for that cap. As will be appreciated by those skilled in the art, the specific shapes of the outside and inside surfaces of upper flange 110 may be varied—depending on the shape of the adapter and the shape of the fuel tank cap with which insert 100 is used—without departing from the scope of the present invention.

A plurality of threaded apertures 120 extend through body 106, between central opening 116 and outside annular surface 122 of the insert body. Screws 114a, 114b and 114c are threaded within apertures 120 and are supported by insert body 106 for movement between retracted and extended positions. Screws 114a and 114b are shown in the retracted position in FIG. 2, while screw 114c is shown in the extended position in FIGS. 2 and 3.

With reference to these Figures in the drawings, in the retracted position, screws 114a, 114b and 114c are fully retracted within body apertures 120—that is, the screws do not project radially outward of those body apertures—so that the screws do not impede axial movement of insert body 106 into fuel tank inlet 104, specifically into a close radial fit with the portion of adapter 102 that forms the fuel tank inlet. Of course, in this position, screws 114a, 114b and 114c also do not interfere with movement of insert body 106 out of that close radial fit, should this ever be desired, to remove insert 100 from inlet 104.

In the extended position, screws 114a, 114b and 114c extend radially outward of body apertures 120 to lock insert 100 within inlet 104. The specific manner in which screws 114a, 114b and 114c lock insert 100 within fuel tank inlet 104 may vary. For example, as is the case with the preferred embodiment of insert 100, screws 114a, 114b and 114c may simply extend below a lower edge of adapter 102 so that abutting contact between the screws and that edge of the adapter limits or prevents upward movement of insert 100. Alternately, screws 114a, 114b and 114c may be threaded outward into a tight pressure engagement with a surface of adapter 102 that axially extends at least partially past body apertures 102 so that frictional engagement between the screws and this surface of the adapter prevents or inhibits upward movement of insert 100. Inward portions of apertures 120 include shoulders 124 that cooperate with shoulders 126 of screws 114a, 114b and 114c to prevent those screws from passing outward completely through apertures 120. The threaded engagement between body 106 and screws 114a, 114b and 114c also inhibits inadvertent movement of those screws, and in particular, tends to prevent the screws from being accidentally lost during shipping or during the initial stages of the installation of insert 100.

As shown in FIG. 2, the length of each screw 114a, 114b and 114c is greater than the body aperture 120 in which the screw is disposed, and the screw is positioned within the aperture with the longitudinal axis of the screw aligned with a radius of body 106. Also, while of course many different ways may be used to move screws 114a, b and c within body apertures 120, with insert 100, the heads of the screws include hex shaped sockets and are moved within the body apertures by means of a suitable tool.

Insert 100 is specifically designed for use with a fuel tank cap (not shown) that is locked in place by means of a plurality of locking fingers that are pivoted outward from a bottom portion of the fuel tank cap and into positions beneath bottom surface 130 of body 106. Fuel tank caps of this type are well known in the art. The lower, inside circumferential edge of body 106 is chamfered to facilitate moving those locking fingers beneath bottom surface 130 of the insert body. Also, lower flange 112 of insert 100 is provided to engage those locking fingers in a tight pressure fit, to insure a tight, secure fit between insert 100 and the fuel tank cap.

Insert 100 is formed from any suitable material such as aluminum, and preferably the insert is formed via a casting process. Alternatively, the insert may be made of a compressed fiber filled material in conjunction with a lightning-proof cap when a lightning-proof application is desired. For certain applications it may be desirable to install insert 100 in a specific annular orientation. For this reason, indexing tab 132, which radially projects outside upper flange 110 of insert body 106, is secured in any suitable way to insert 100, specifically body 106 thereof. Such an insert may be easily installed in a preferred annular orientation by axially aligning indexing tab 132 with a specific area or portion of adapter 102. A small recess may be formed in outside annular surface 122 of body 106 to partially receive indexing tab 132, facilitating connecting the tab to the insert body and helping to hold that tab in place relative to the insert body.

FIGS. 4 and 5 illustrate various stages of the installation of insert 100. It should be noted that, first, any existing fuel tank cap is removed from inlet 104. Once this is done, insert 100, with screws 114a, 114b and 114c fully retracted, is axially moved into inlet 104, until the outside surface of upper flange 110 of the insert seats against an upper surface of adapter 102. Next, screws 114a, 114b and 114c are extended, locking insert 100 in place. Advantageously, locking screws 114a, 114b and 114c are, first, all partially extended and, then, all fully extended. Once insert 100 is installed, a conventional fuel tank cap may be connected to the insert to close opening 116 therein using the same sealing surface of the original insert. As previously mentioned, insert 100 is particularly designed for use with a fuel tank cap that is locked in place by means of a plurality of locking figers that pivot outward from a bottom portion of the fuel tank cap and into positions directly underneath bottom surface 130 of the insert.

With regard to FIGS. 6 through 12 insert 200, generally, comprises an annular body in the form of a cylindrical frame 206, an upper flexible flange 210, which extends outward from the annular body, and lower locking tabs 212, which, as discussed in greater detail below, cooperate with flange 210 to hold insert 200 in place within a fuel tank inlet. Preferably, insert 200 is formed from two individual pieces, retainer member 214 and pawl member 216, which are separately cut and stamped from a thin, flat metal sheet and then joined together to form the insert. More particularly, retainer member 214 includes cylindrical side wall 220, upper flange 210, and lower flange 222. Pawl member 216 includes annular ring 224 and lower locking tabs 212.

Figure 7:
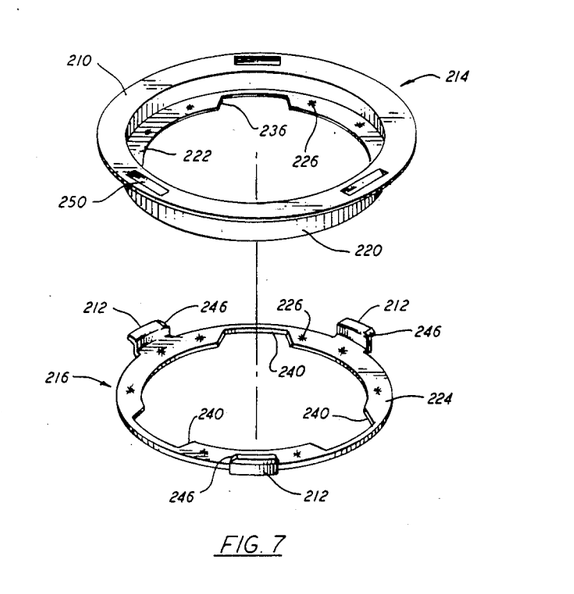
FIG. 7 is an exploded view of the insert shown in FIG. 6.
Figure 8:
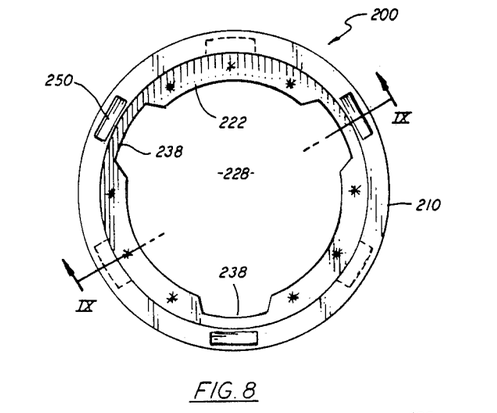
FIG. 8 is a top view of the insert illustrated in FIGS. 6 and 7.

Annular ring 224 of pawl member 216 and lower flange 222 of retainer member 214 both have an annular shape, with the inner and outer diameters of annular ring 224 being substantially equal respectively, to the inner and outer diameters of lower flange 222. In assembly, lower flange 222 is positioned directly on top of and secured to annular ring 224, with the inner and outer circumferential edges of lower flange 222 axially aligned, respectively, with the inner and outer circumferential edges of annular ring 224. Annular ring 224 and lower flange 222 may be secured together in any suitable way, for example by welding at the spots 226. Flange 222 and ring 224 thus form central opening 228 which, analogous to central opening 116 of insert 100, is large enough to receive fuel nozzles that are normally used to dispense avgas but small enough so that nozzles that are conventionally used to dispense jet fuel will not fit within the opening.

Figure 9:
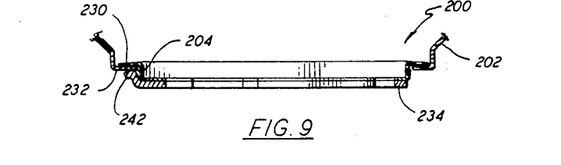
FIG. 9 shows a sectional view of the insert illustrated in FIGS. 7 and 8, taken along the line IX—IX of FIG. 8.

Upper flange 210 extends outward and slightly downward from an upper edge of cylindrical sidewall 220 and is provided to engage upper surface 230 of adapter 202 that extends around inlet 204. Lower locking tabs 212 extend outward and upward from annular ring 224 of pawl member 216 and are provided to engage under surface 232 of adapter 202. Thus, in use, upper flange 210 and lower locking tabs 212 hold insert 200 securely in place within inlet 204, in pressure engagement with both the upper and under surfaces 230 and 232 of flange 234 of adapter 202.

Insert 200 is specifically designed for use with a fuel tank cap (not shown) that is locked in place by means of a plurality of locking fingers that radially extend outward from a bottom portion of the fuel tank cap and that are circumferentially rotated beneath bottom surface 236 of insert 200. Fuel tank caps of this type are well known in the art. Lower flange 222 of retainer member 214 and annular ring 224 of pawl member 216 each have a plurality of recesses 238 and 240 respectively that radially extend outward from the inside circumferential edges of the flange and ring. In assembly, recesses 238 of flange 222 are axially aligned with recesses 240 of ring 224. The locking fingers of the fuel tank cap used with insert 200 may be moved to a position engaging bottom surface 236 of the insert by simply axially moving those locking fingers through recesses 238 and 240 and then rotating the locking fingers beneath the adjacent surfaces of annular ring 224 of insert 200.

Figure 10:
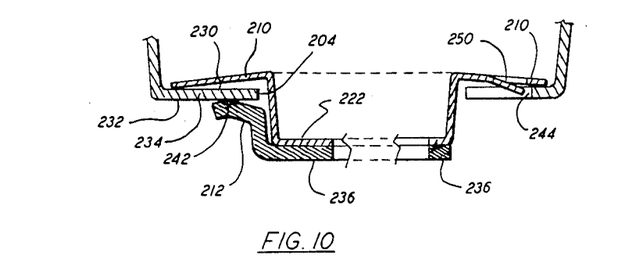
FIG. 10 shows two enlarged portions of FIG. 9, and in particular illustrates the pressure engagement between the insert shown in FIG. 9 and a wall of a fuel tank.

With particular reference to FIGS. 9 and 10, the portions 242 of locking tabs 212 that actually engage undersurface 230 of adapter 202 are rounded, not sharp, and specifically are upwardly convex. This arrangement facilitates rotation of locking tabs 212, and thus the entire insert 200, relative to and against adapter 202. Moreover, locking tabs 212 are spaced approximately evenly around the circumference of insert 200, resulting in a relatively symmetrical and uniform distribution of the pressure forces applied to adapter 202 by the locking tabs of insert 200.

Figure 11:
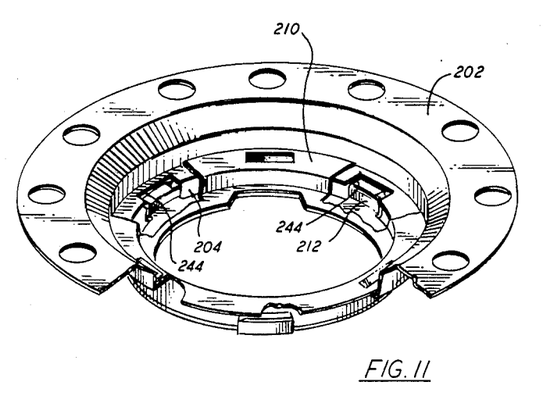
FIGS. 11 and 12 depict two steps of a method of installing the insert shown in FIGS. 6 through 10 in a fuel tank inlet.
Figure 12:
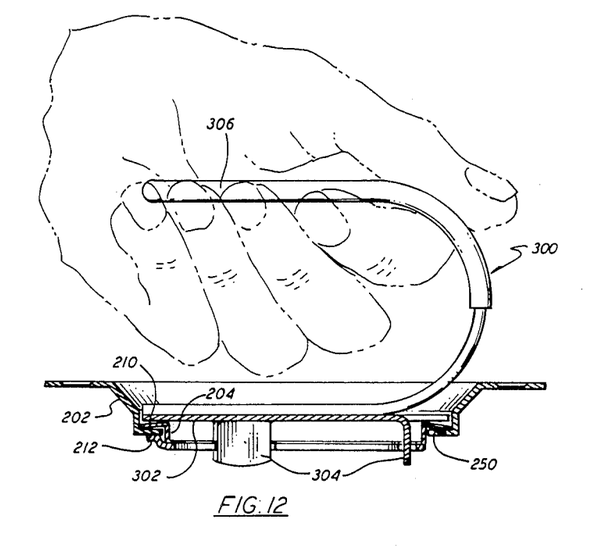

Insert 200 is specifically designed for use with an adapter 202 also having a plurality of recesses 244 that radially extend outward from an inside circumferential edge of the adapter, and FIGS. 11 and 12 depict different stages of the installation of insert 200 within inlet 204 formed by that adapter. Here too it should be noted that, preliminarily, the existing fuel tank cap is removed from adapter 202. Then insert 200 is positioned above inlet 204 with locking tabs 212 axially aligned with recesses 244 of adapter 202. Insert 200 is lowered to move locking tabs 212 through recesses 244 and to bring upper flange 210 into pressure engagement with upper surface 230 of adapter 202. Next, insert 200 is pushed downward and is rotated to slide lower locking tabs 212 beneath and into pressure engagement with under surface 232 of adapter 202. This movement tends to flatten the downward orientation of the upper flange 210. To facilitate moving locking tabs 212 past edges of recesses 244, radially extending edges of the locking tabs are bevelled, as shown at 246 in FIG. 7. With locking tabs 212 in pressure engagement with under surface 232 of adapter 202 and upper flange 210 in pressure engagement with upper surface 230 of that adapter, insert 200 is securely held in place in inlet 204. In order to comply with certain requirements of the Federal Aviation Administration, it may be necessary to further bend one tab manually using an implement, such as a screw driver, into locking position. This is done to assure the locking in place of the insert.

Upper flange 210 includes a plurality of flexible tabs 250 that slant slightly downward from the main portion of the upper flange. Tabs 250 are positioned so that they are all moved over recesses 244 of adapter 202 when insert 200 reaches a preferred position relative thereto. As tabs 250 are moved over recesses 244, the tabs flex or snap downward into those recesses, producing an audible click, indicating that insert 200 has reached the preferred position and that rotation of the insert should be terminated. In the embodiment shown in FIGS. 6–11, this rotation is approximately 60 degrees. With insert 200 in position, a conventional fuel tank cap is connected to the insert to close central opening 228 thereof.

Figure 13:
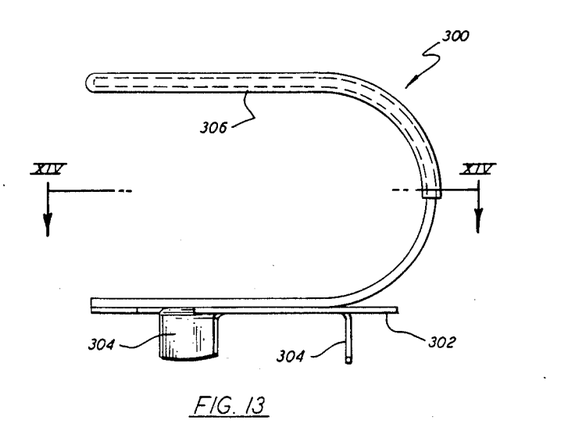
FIG. 13 is a side view of a tool that may be used to secure the insert shown in FIGS. 6 to 12 in a fuel tank inlet.
Figure 14:
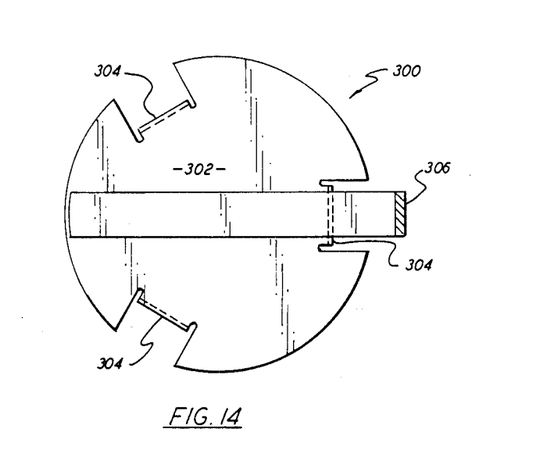
FIG. 14 is a top sectional view taken along line XIV—XIV of FIG. 13.

Preferably, a tool 300, shown in FIGS. 12, 13 and 14 is used to lock insert 200 in place in inlet 204. Generally, tool 300 comprises plate 302, projections 304, and handle 306. Plate 302 has a flat, generally circular shape. Projections 304, which preferably are integral with plate 302, extend axially therefrom and are designed to be inserted into recesses 238 and 240 of insert 200. Handle 306 is secured, for example by welding, to plate 302 and extends axially upward therefrom. Handle 306 is provided and shaped to help an individual grasp and manipulate tool 300.

Tool 300 is employed in the above-outlined method for installing insert 200 immediately after locking tabs 212 of insert 200 have been axially moved through recesses 244 of adapter 202 and upper flange 210 of the insert has been brought into engagement with upper surface 230 of that adapter. Specifically, at that stage of the installation of insert 200, plate 302 of tool 300 is placed against the upper surface of upper flange 210, with axial projections 304 extending into recesses 236 and 240. Tool 300 is then pushed downward, pushing flange 210, cylindrical frame 206, and locking tabs 212 downward. Tool 300 is then rotated so that engagement between projections 304 and the edges of recesses 238 and 240 forces insert 200 to also rotate. Insert 200 is rotated in this manner until upper tabs 250 snap into recesses 244. At this time, tool 300 is removed simply by pulling it axially away from insert 200.

The vertical spacing between the lower edge of unflexed upper flanger 210 and the upper surface of tabs 212 is less than the thickness of adaptor flange 234. When the insert 200 is pressed downwardly during insertion by tool 300, the upper flange 210 flexes to enlarge the vertical spacing between it and the locking tabs 212. This permits rotation of the insert with the adaptor flange 234 sliding between the insert flange 210 and tabs 212 of the insert. When the downward pressure of the tool is removed, the flexible nature of the insert flange 210 maintains a tight pressure engagement of this flange and the tabs 212 against the opposite surfaces of the adaptor flange 234.

I claim:

1. An insert for a fuel tank inlet comprising:
   (a) an annular body defined by a cylindrical frame;
   (b) an upper flexible flange integral with and extending outward about the entire circumference of an upper portion of the cylindrical frame to engage an upper surface of a fuel tank wall that extends around an inlet thereto; and
   (c) at least one rigid locking tab fixed with respect to extending outward and upward from a lower portion of the cylindrical frame to engage an under surface of the fuel tank wall, the spacing between the upper flexible flange, when unflexed, and the locking tab being less than the thickness of the fuel tank wall, wherein the upper flange and the locking tab hold the insert in tight pressure engagement with the fuel tank wall.

2. An insert according to claim 1 wherein:
   (a) the upper flange extends outward from an upper edge of the cylindrical frame; and
   (b) the locking tab extends outward and upward from a lower edge of the cylindrical frame;

3. An insert for a fuel tank inlet comprising:
   (a) a retainer member including
      (i) a cylindrical sidewall, and
      (ii) an upper flexible flange integral with and extending outward about the entire circumference of an upper portion of the cylindrical sidewall to engage an upper surface of a wall of a fuel tank that extends around an inlet thereto, and
      (iii) a lower flange extending inward from a lower portion of the cylindrical sidewall; and
   (b) a pawl member including
      (i) an annular ring secured to the lower flange of the retainer member, and
      (ii) at least one locking tab fixed with respect to extending outward and upward from the annular ring, outside the cylindrical sidewall of the retainer member, to engage an under surface of the fuel tank wall, the spacing between the upper flexible flange, when unflexed, and the locking tab being less than the thickness of the fuel tank wall, wherein the upper flange and the locking tab hold the insert in tight pressure engagement with the fuel tank wall.

4. An insert according to claim 3 wherein the upper flange extends outward from an upper edge of the cylindrical sidewall.

5. An insert according to claim 3 wherein:
   (a) inside and outside circumferential edges of the lower flange are axially aligned respectively with inside and outside circumferential edges of the annular ring;
   (b) the lower flange includes a plurality of recesses extending outward from the inside circumferential edge thereof, and the annular ring includes a plurality of recesses extending outward from the inside circumferential edge thereof; and
   (c) the recesses of the lower flange are axially aligned with the recesses of the annular ring.

6. An insert according to claims 1 or 3 wherein a radially extending edge of the locking tab is bevelled to facilitate rotating the locking tab beneath the fuel tank wall.

7. An insert according to claim 6 wherein the locking tab includes an upwardly convex top portion to facilitate rotation of the locking tab beneath the fuel tank wall.

8. An insert according to claims 1 or 3 for use with a fuel tank wall having at least one recess, and wherein the upper flange includes at least one flexible tab to snap into the recess of the fuel tank wall and to produce an audible sound when the insert reaches a predetermined position relative to the fuel tank wall.

9. An insert according to claim 8 for use with a fuel tank wall having a plurality of recesses circumferentially equally spaced apart along the fuel tank wall, and wherein:
   (a) the insert includes a plurality of locking tabs circumferentially equally spaced apart along the insert; and
   (b) the flexible tab of the upper flange is positioned to snap into a recess of the fuel tank wall when the locking tabs are circumferentially midway between the recesses of the fuel tank wall.

* * * * *